(12) United States Patent
Medina

(10) Patent No.: US 10,752,153 B2
(45) Date of Patent: Aug. 25, 2020

(54) VEHICLE BED PLATFORM

(71) Applicant: Brandon Orlando Medina, Mountain View, CA (US)

(72) Inventor: Brandon Orlando Medina, Mountain View, CA (US)

( * ) Notice: Subject to any disclaimer, the term of this patent is extended or adjusted under 35 U.S.C. 154(b) by 140 days.

(21) Appl. No.: 15/997,825

(22) Filed: Jun. 5, 2018

(65) Prior Publication Data
US 2019/0366904 A1 Dec. 5, 2019

(51) Int. Cl.
*B60P 3/39* (2006.01)
*B60N 3/00* (2006.01)
*A47C 17/80* (2006.01)

(52) U.S. Cl.
CPC ............... *B60P 3/39* (2013.01); *A47C 17/80* (2013.01); *B60N 3/008* (2013.01)

(58) Field of Classification Search
CPC ......... B60N 3/008; A47C 17/80; B60R 9/065; B60R 13/013; B60P 3/39
USPC ............................................... 296/164, 37.14
See application file for complete search history.

(56) References Cited

U.S. PATENT DOCUMENTS

| | | | | |
|---|---|---|---|---|
| 4,733,898 A | * | 3/1988 | Williams | B62D 33/02 224/404 |
| 4,969,678 A | * | 11/1990 | Loisel | B60P 3/36 224/281 |
| D377,463 S | | 1/1997 | Cressall | |
| 5,685,593 A | * | 11/1997 | O'Connor | B60R 13/01 224/404 |
| 5,996,868 A | * | 12/1999 | Paradis | B60R 9/00 224/404 |
| D426,187 S | * | 6/2000 | Shultz | D12/414.1 |
| 6,318,781 B1 | * | 11/2001 | McKee | B60R 9/00 296/26.09 |
| 6,695,375 B1 | * | 2/2004 | May | B60R 9/00 224/281 |
| 7,083,219 B1 | * | 8/2006 | Gregory | B60P 1/003 296/100.12 |
| 7,322,637 B2 | | 1/2008 | Smith | |
| 7,600,800 B2 | * | 10/2009 | Suzuki | B60R 5/04 296/37.14 |
| 8,746,778 B2 | | 6/2014 | Dempsey | |
| 10,104,864 B2 | * | 10/2018 | Murray | A01K 1/0035 |
| 2007/0158968 A1 | * | 7/2007 | Chandler | B60P 3/14 296/37.6 |
| 2010/0235988 A1 | * | 9/2010 | Pittman | A47C 17/80 5/119 |
| 2013/0270854 A1 | * | 10/2013 | Weller | B60R 9/00 296/37.6 |
| 2015/0232133 A1 | * | 8/2015 | Miller | B62D 33/03 296/26.05 |
| 2016/0144800 A1 | * | 5/2016 | Henderson | B60R 13/013 296/24.4 |
| 2016/0235209 A1 | * | 8/2016 | Cervantes | A47C 19/12 |

(Continued)

OTHER PUBLICATIONS

Erin Sullivan, "How to Turn Your SUV Into a Camper", Erin Outdoors website, Sep. 21, 2015, pp. 1-25.*

(Continued)

*Primary Examiner* — Jason S Morrow
(74) *Attorney, Agent, or Firm* — Patent Law Office PC; Bao Tran

(57) ABSTRACT

A vehicle bed includes a vehicle body; and a foldable bed frame disposed inside the vehicle body.

14 Claims, 7 Drawing Sheets

(56) References Cited

U.S. PATENT DOCUMENTS

2017/0210272 A1 7/2017 Shih
2017/0335561 A1* 11/2017 Wickramasekera .. H01L 31/042

OTHER PUBLICATIONS

"Warfield Off-Road Storage Drawers Review", IH8MUD.com website, Nov. 15, 2009, pp. 1-18.*

* cited by examiner

VEHICLE BED PLATFORM

The present invention relates to vehicle bed frames.

Outdoor activities such as camping have increased in popularity over the years, along with the popularity of camping in pickup trucks and tent trailers. Typical tent trailers come equipped with a one-piece hard top covering the vehicles cargo bed. The hard tops are raised up by various mechanical or hydraulic methods. The bed platforms slide out over the front and rear of the trailer using metal guides under the platforms. The tents are attached to the hard top and the sides of the trailer as well as underneath of the bed platforms. One-piece solid tonneau covers with tent attached and hinged to the cargo bed have also been adapted and are popular for pickup trucks. They are low priced, but have less space than the hard topper, but are the most efficient in aerodynamics and fuel economy on the road. The tent truck campers have been used and they are essentially an adaptable tent over a truck cargo bed. Some have added floors or platforms above the cargo beds steel floor. With the added floor or not, they still fall into a category of being cramped for space with little or no storage area and not very comfortable. They also don't give protection from the weather or thief when closed and have poor ventilation.

SUMMARY OF THE INVENTION

In one aspect, a vehicle bed includes a vehicle body; and a foldable bed frame disposed inside the vehicle body.

Implementations of the bed may include one or more of the following. The foldable bed frame includes three walls connected to each other to form a base with an open ceiling and an open side; a divider to split the open side into two divided portions; and a sleeping surface coupled to the open ceiling. A foldable head rest portion can be hingeably connected to the sleeping surface. A support piece for the foldable head rest portion can be placed above a vehicle seat during use. One or more slidable trays can be received by one or more divided portions. Left and right lips can be mounted to the sides of opposing walls. Left and right hinged portions can be connected to the sleeping surface and adapted to be opened and to rest above the left and right lips. The vehicle body can be all vehicles including trucks, wagons/hatchbacks, sedans, vans/minivans, or sport utility vehicles (SUVs). One or more doors at a rear of the vehicle body can be opened to receive the foldable bed frame. The bed frame can be wood, plastic, copper, aluminum, or any suitable material.

Advantages of the system may include one or more of the following. The system provides a low-cost vehicle cargo bed frame for sleeping purposes. The bed frame allows a mattress to be disposed inside of the camping car. The bed is highly functional and provides quality and restful sleep or rest. The bed frame is portable and removable when not needed. The bed frame also provides efficient storage bins that provide good ventilation, yet light weight, without hinges or metal guides to slide on.

BRIEF DESCRIPTION OF DRAWINGS

The accompanying drawing is incorporated into and forms a part of the specification to illustrate the preferred embodiments of the present invention. Throughout the drawing, like reference numerals designate corresponding elements. The drawing, together with the description, explains the principles of the invention and illustrates an exemplary embodiment showing how the invention can best be made and used. The drawing should not be construed as limiting the invention to the illustrated and described embodiment. Various advantages and features of the invention will be understood from the following detailed description taken in connection with the appended claims and with reference to the attached drawing in which:

FIG. 5 is a perspective view of a bed platform for a vehicle.

FIG. 6 is a top view thereof;

FIG. 7 is a bottom view thereof;

FIG. 8 is a front view thereof;

FIG. 9 is a rear view thereof; and,

FIG. 10 is a right side view thereof.

DETAILED DESCRIPTION

Figure 1:
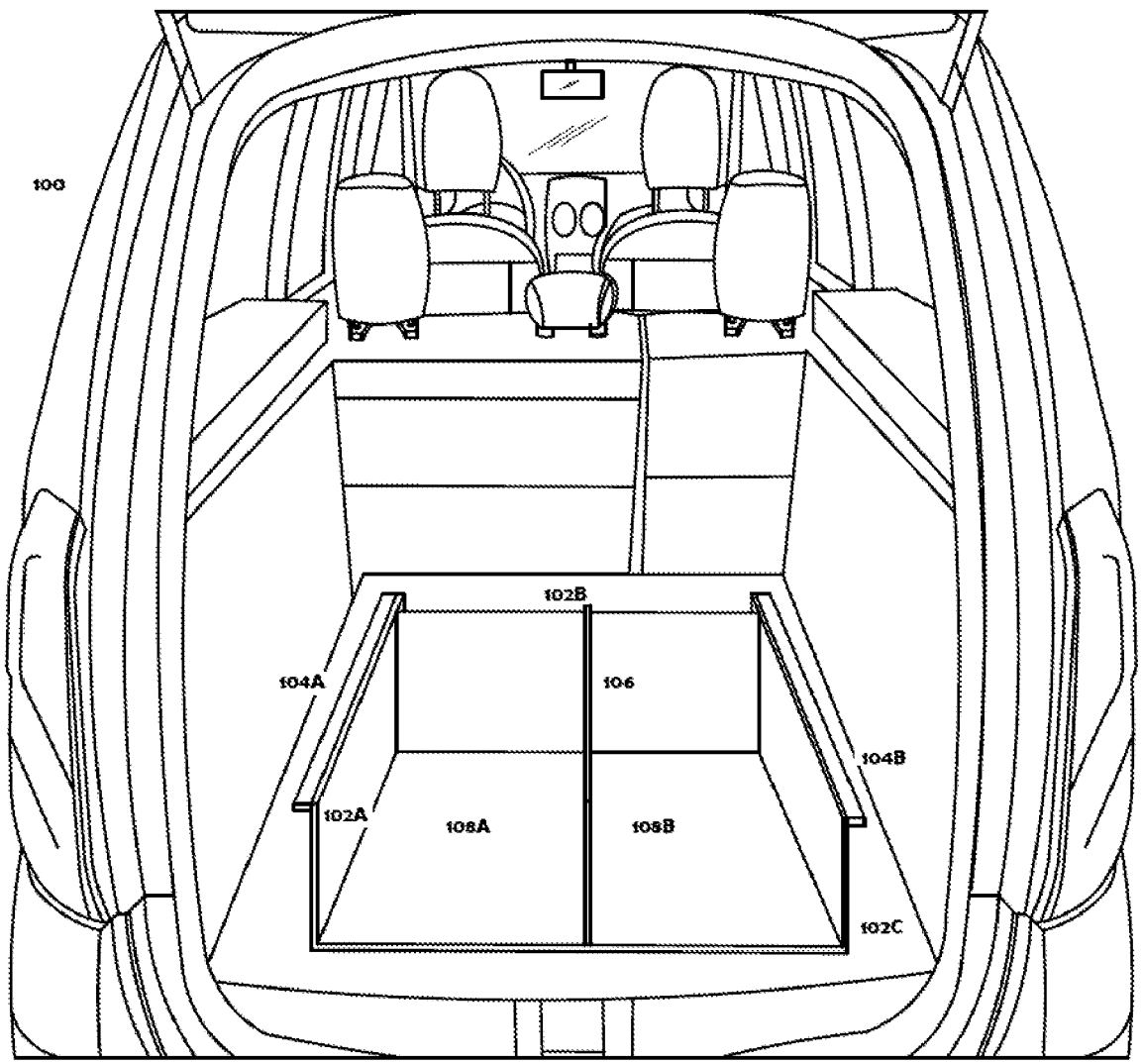
FIG. 1 is a rear view of a vehicle with a bottom bed frame.

In the description which follows, like parts are marked throughout the specification and drawing with the same reference numerals, respectively. The drawing figures are not necessarily to scale in the interest of clarity.

FIG. 1 is a rear view of a vehicle with a bottom bed frame. One embodiment works with minivans or vans, which are popular for family transport. One of the great advantages of the van/minivan is its versatility. A minivan may perform family related transport functions on weekends and evenings while providing business transportation during the day. In order to meet these varying needs, minivans are designed with removable seats, fold down seats, and other storage related advantages while also supporting the creature comforts such as dual heating systems, airbags, ABS brakes, leather seats, and so forth. While vans are described for the preferred embodiment, the present system can work in sport utility vehicles and station wagons, among others.

Turning now to FIG. 1, the vehicle has a trunk providing storage space. Storage space in sport utility vehicles, minivans and station wagons is usually available as rear seat placement or rear deck placement. Minivans and sport utility vehicles have rear doors that are vertically hinged on opposite sides and swing outwardly to provide access to a rear deck space. Alternatively, they may have horizontally hinged doors that swing upward to open. The bed frame 100 is positioned in the storage space of the vehicle. The bed frame 100 is substantially box-shaped with open-ended walls 102A-102C. The frame 100 has dual longitudinal lips 104A-104B and a divider 106 parallel with the lips 104A-104B. The divider 106 and the walls 102A-102C define two drawer partitions 108A-108B.

Figure 2:
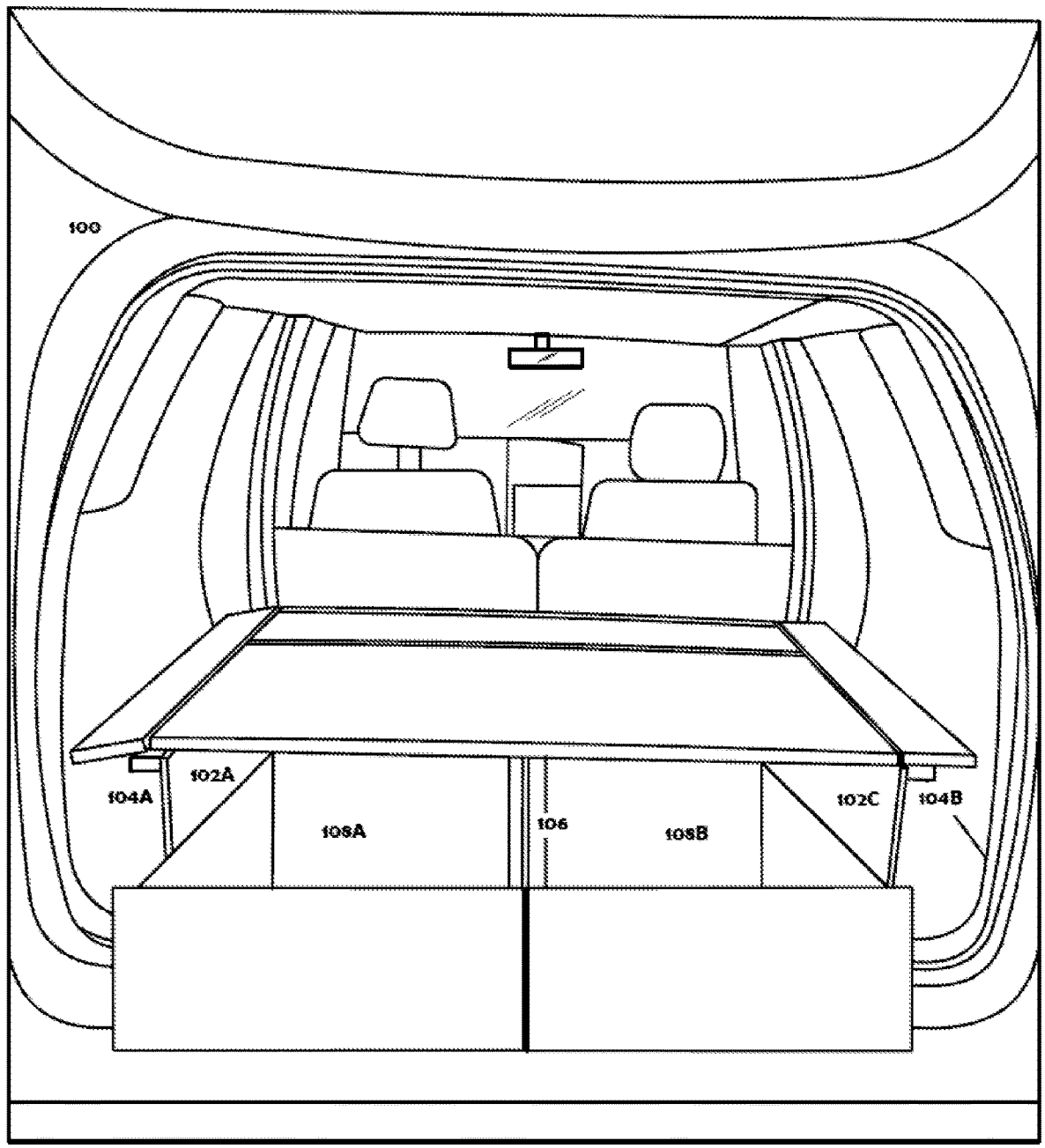
FIG. 2 is a rear view of a vehicle with a sleeping surface above the bottom bed frame and drawers movable relative to the front horizontal side of the frame.
Figure 3:
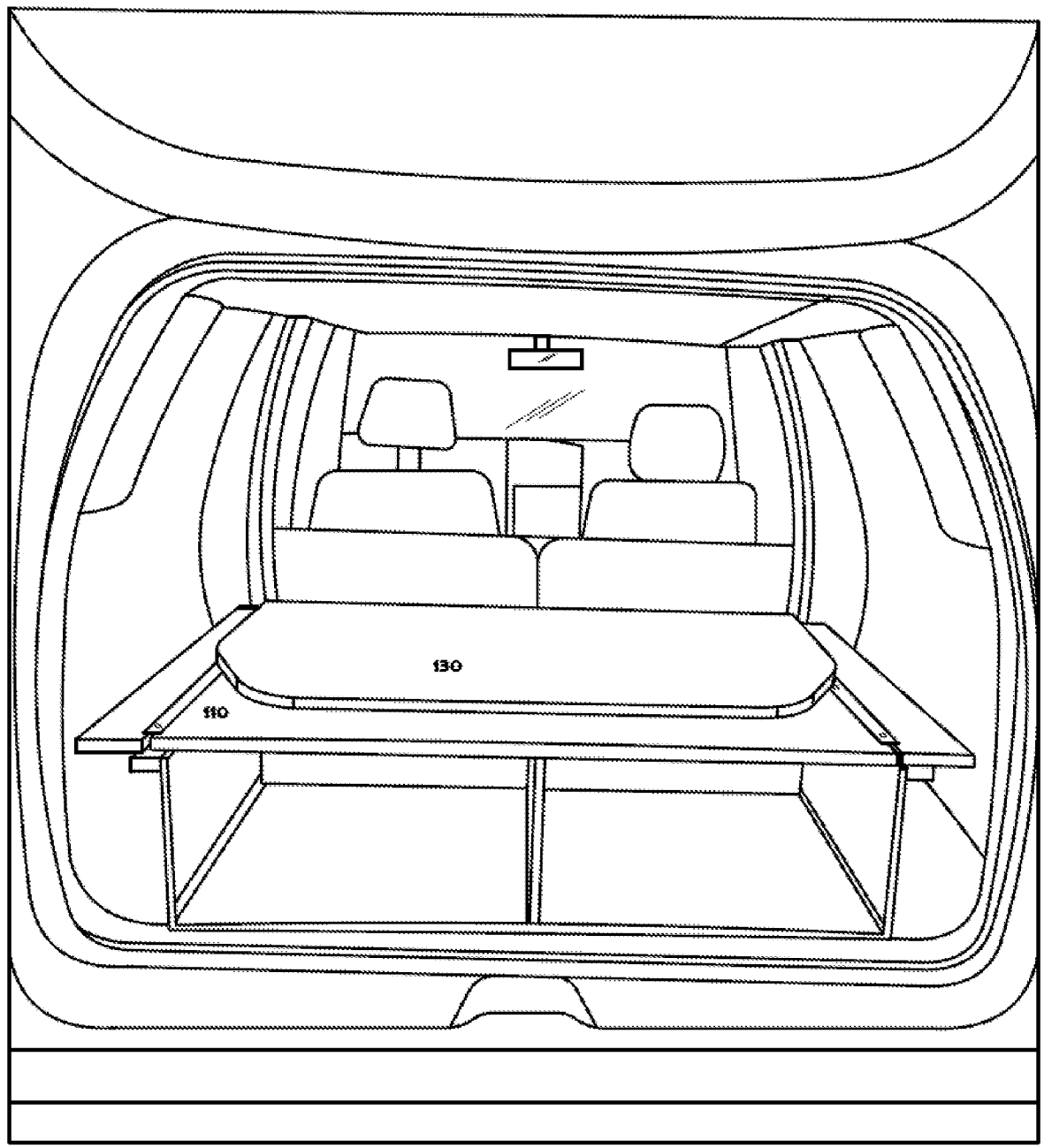
FIG. 3 shows a second embodiment with a head rest piece in a closed position on a rear horizonal side of the frame, and lateral pieces hingeable on both longitudinal sides of the frame.

FIG. 2 is a rear view of a vehicle with a sleeping surface 110 above the bottom bed frame and drawers 118A-118B movable in and out relative to the left and right longitudinal sides of the frame. FIG. 3 shows a second embodiment with a head rest piece in a closed position on a rear horizonal side of the frame, and lateral panels hingeable on both longitudinal sides of the frame. Located on top and on opposite ends of the bed frame are dual hinged panels 112A-112B that rest above the dual longitudinal lips 104A-104B. A head rest piece 130 is hingeably connected to the sleeping surface 110.

The sleeping surface provides enough structural strength to bear the weights of the mattress and the user. The height of the bed platform is convenient for the user to get on the bed and get off bed, thereby providing safety, convenience and comfort.

Figure 4:
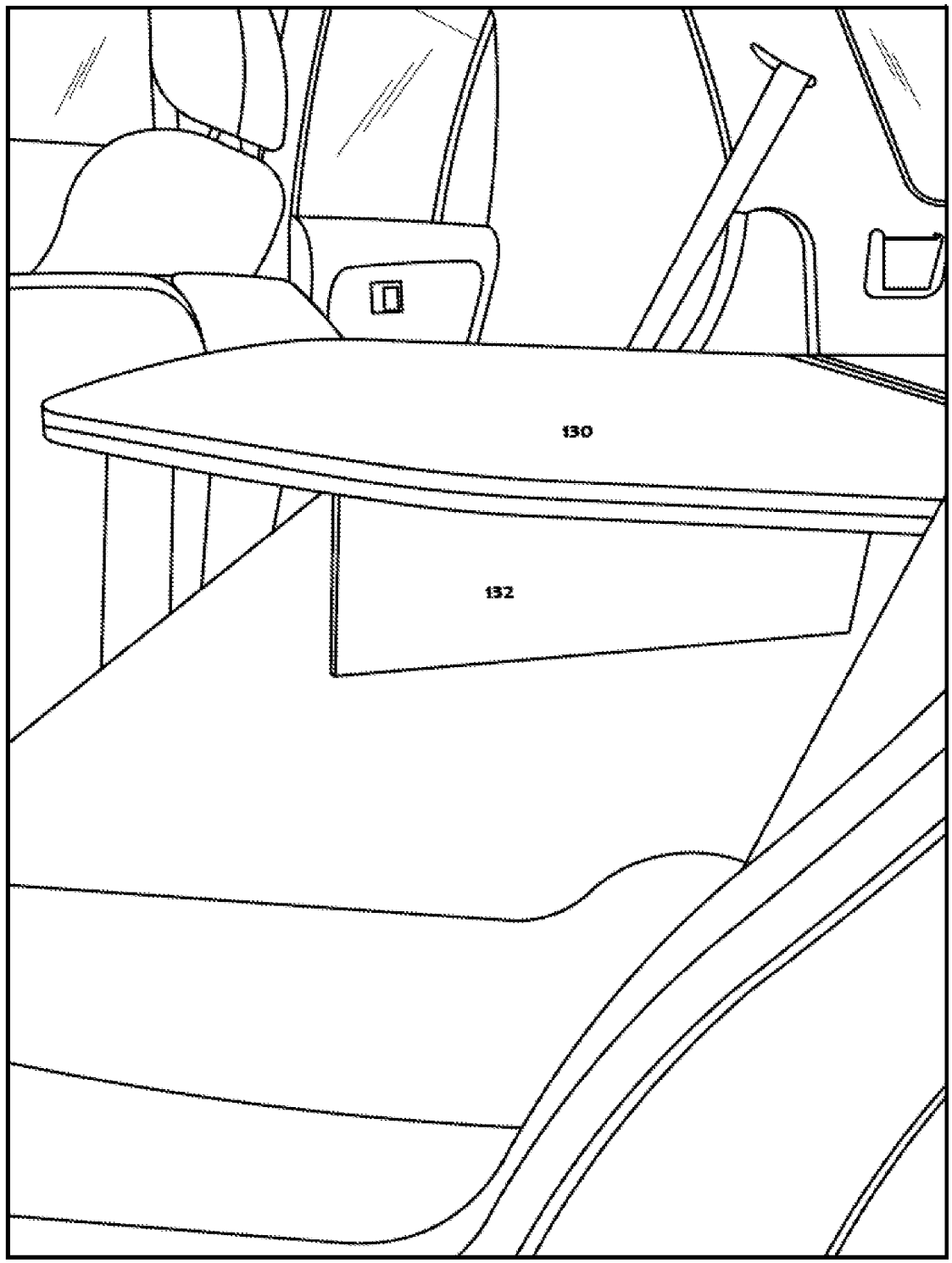
FIG. 4 shows the head rest piece of FIG. 3 in an open position to support a sleeper.

While FIG. 3 shows the head rest piece 130 in a folded or closed configuration, FIG. 4 shows the head rest piece of FIG. 3 in an open position to support a sleeper. In this position, the head rest piece 130 is supported by a support module 132 that is placed between the head rest piece 130 and a seat 132. The module 132 can be a V-shaped module, or can simply be a board.

While the embodiment of FIGS. 1-4 use gravity to secure the sleeping surface 110 to the frame 100, other means of securing the two items can be used. For example, in another embodiment, each dual panel assembly is arranged with a first panel slidably coupled to hinges attached to the top of the bed frame. Together the two panels form a stable, upright corner support for securing the sleeping surface to the frame.

Figure 5:
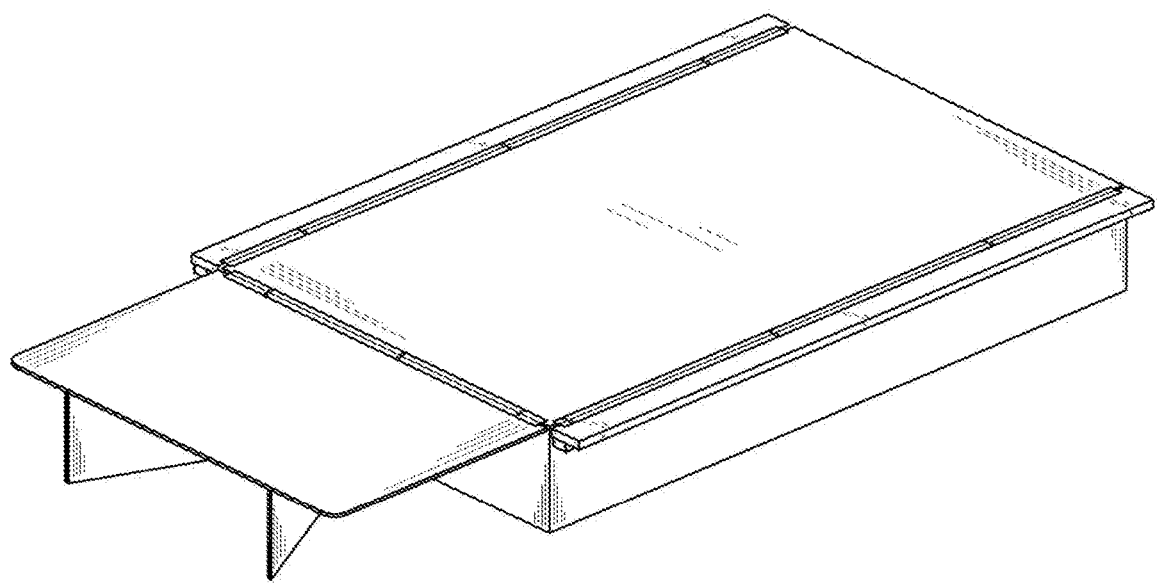
FIGS. 5-10 show in more details the bed frame.
Figure 6:
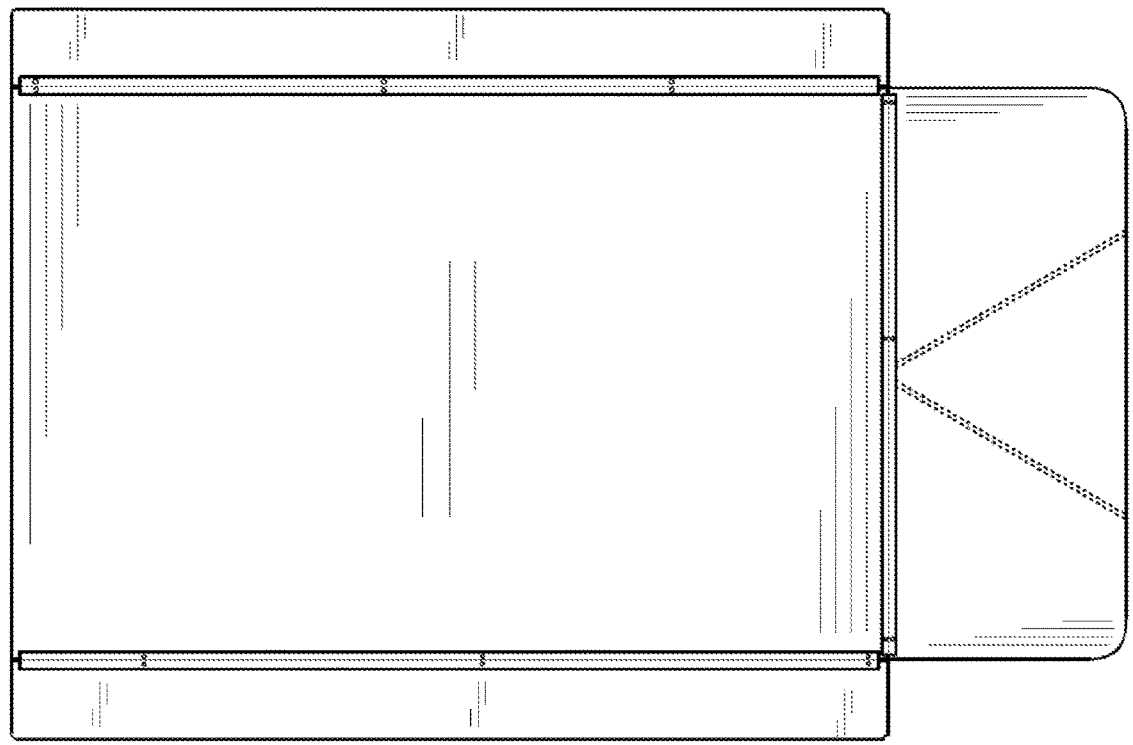
Figure 7:
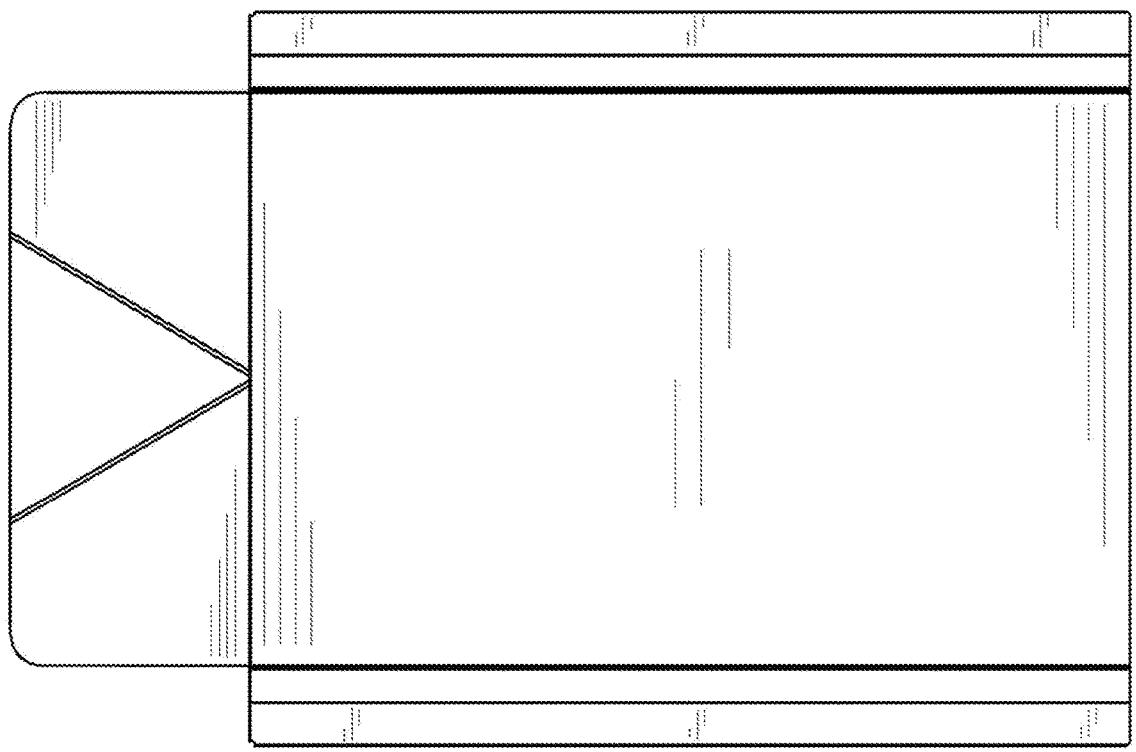
Figure 8:
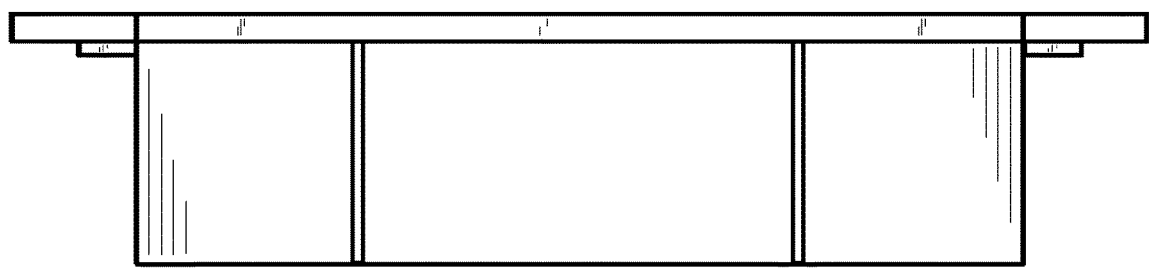
Figure 9:
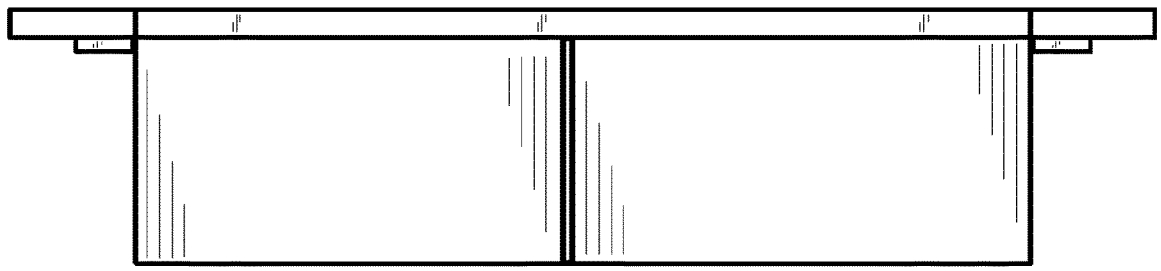
Figure 10:

FIGS. 5-10 show in more details the bed frame. FIG. 5 is a perspective view of a bed platform for a vehicle. FIG. 6 is a top view thereof; FIG. 7 is a bottom view thereof; FIG. 8 is a front view thereof; FIG. 9 is a rear view thereof; and, FIG. 10 is a right side view thereof. The left side view is a mirror image of FIG. 10.

Figure 11:
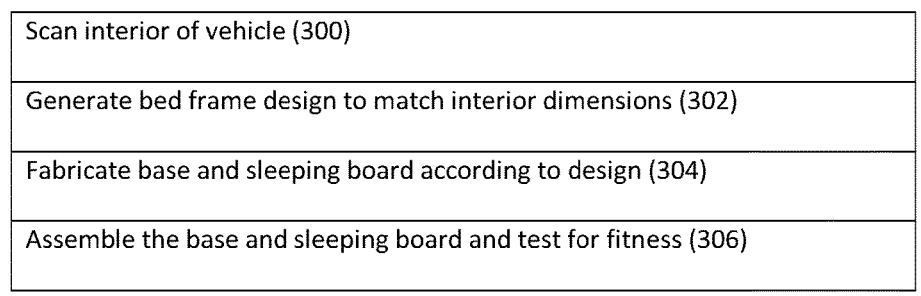
FIG. 11 shows an exemplary process to form tight tolerance custom bed frames.

FIG. 11 shows an exemplary process to form tight tolerance custom bed frames. The process includes:

Scan interior of vehicle (300)

Generate bed frame design to match interior dimensions (302)

Fabricate base and sleeping board according to design (304)

Assemble the base and sleeping board and test for fitness (306)

In one embodiment, a 3D scanner is used to scan the vehicle interior dimensions, and a CAD system can be used to automatically size the base and the sleeping board to the vehicle.

Based on the spirit of the present invention, the structure of the bed frame can be modified. For example, instead of the manual moving of hinges, the bed frame can be motorized with actuators However, in such condition the size and the shape of the frame should be modified correspondingly. It should be noted that the above embodiment can be modified based on that the sleeping surface can be fixed on the bed platform by gluing, welding, riveting, screwing, pinning, or other fixing techniques. In addition, the structure of the bed frame can be modified, for example, forming a mesh-shaped frame, adding more corner plates, and etc.

The vehicle may also be called as a motorhome, a caravan, or a recreational vehicle (RV), etc. according to its size, structure, and functions.

With respect to the above description then, it is to be realized that the optimum dimensional relationships for the parts of the invention, to include variations in size, materials, shape, form, function and manner of operation, assembly and use, are deemed readily apparent and obvious to one skilled in the art. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A vehicle bed, comprising:
a vehicle body; and
a foldable bed frame disposed inside the vehicle body, wherein the foldable bed frame includes:
three walls connected to each other to form a base with an open ceiling and an open side;
a sleeping surface coupled to the open ceiling; and
a foldable head rest portion coupled to the sleeping surface, further comprising a V-shaped support structure coupled to one side of the foldable head rest portion.

2. The bed of claim 1, wherein the foldable bed frame comprises a divider to split the open side into two divided portions.

3. The bed of claim 1, comprising one or more slidable trays to be received by one or more divided portions.

4. The bed of claim 1, comprising left and right lips coupled to the sides of opposing walls.

5. The bed of claim 4, comprising left and right hinged portions coupled to the sleeping surface adapted to be opened and to rest above the left and right lips.

6. The bed of claim 1, wherein the vehicle body comprises a van body, a minivan body, or an SUV body.

7. The bed of claim 1, comprising one or more openable doors at a rear of the vehicle body to receive the foldable bed frame.

8. The bed of claim 1, wherein the bed frame comprises wood.

9. A vehicle bed, comprising:
a vehicle body; and
a foldable bed frame disposed inside the vehicle body, wherein the foldable bed frame comprises:
three walls connected to each other to form a base with an open ceiling and an open side;
a divider to split the open side into two divided portions;
a sleeping surface coupled to the open ceiling; and
a foldable head rest portion coupled to the sleeping surface, further comprising a V-shaped support structure coupled to one side of the foldable head rest portion.

10. The bed of claim 9, comprising one or more slidable trays to be received by one or more divided portions.

11. The bed of claim 9, comprising left and right lips coupled to the sides of opposing walls.

12. The bed of claim 11, comprising left and right hinged portions coupled to the sleeping surface adapted to be opened and to rest above the left and right lips.

13. The bed of claim 9, wherein the vehicle body comprises a van body, a minivan body, or an SUV body.

14. The bed of claim 9, comprising one or more openable doors at a rear of the vehicle body to receive the foldable bed frame.

* * * * *